(12) United States Patent
Yoshii

(10) Patent No.: US 8,930,286 B2
(45) Date of Patent: Jan. 6, 2015

(54) INFORMATION PROCESSING APPARATUS, PROCESSING METHOD THEREFOR, AND NON-TRANSITORY COMPUTER-READABLE STORAGE MEDIUM

(75) Inventor: Hiroto Yoshii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 13/281,115

(22) Filed: Oct. 25, 2011

(65) Prior Publication Data

US 2012/0109861 A1 May 3, 2012

(30) Foreign Application Priority Data

Nov. 2, 2010 (JP) ................................. 2010-246747

(51) Int. Cl.
*G06F 15/18* (2006.01)
*G06N 99/00* (2010.01)

(52) U.S. Cl.
CPC .................................. *G06N 99/005* (2013.01)
USPC ........................................................... 706/12

(58) Field of Classification Search
None
See application file for complete search history.

(56) References Cited

U.S. PATENT DOCUMENTS

| | | | |
|---|---|---|---|
| 5,754,686 A | 5/1998 | Harada et al. | |
| 5,781,663 A | 7/1998 | Sakaguchi et al. | |
| 5,835,632 A | 11/1998 | Takasu et al. | |
| 5,982,933 A | 11/1999 | Yoshii et al. | |
| 6,009,199 A * | 12/1999 | Ho | 382/224 |
| 6,035,062 A | 3/2000 | Takasu et al. | |
| 6,052,482 A | 4/2000 | Arai et al. | |
| 6,208,755 B1 | 3/2001 | Mori et al. | |
| 6,212,298 B1 | 4/2001 | Yoshii et al. | |
| 6,233,352 B1 | 5/2001 | Yoshii | |
| 6,373,473 B1 | 4/2002 | Sakaguchi et al. | |
| 6,421,461 B1 | 7/2002 | Arai et al. | |
| 6,671,403 B1 | 12/2003 | Takasu et al. | |
| 2010/0094800 A1 * | 4/2010 | Sharp | 706/55 |

FOREIGN PATENT DOCUMENTS

WO 2010/100701 A1 9/2010

OTHER PUBLICATIONS

Baird, Moll, An, Casey, "Document Image Content Inventories", Proceedings of SPIE vol. 6500, Document Recognition and Retrieval XIV, Jan. 28, 2007, pp. 1-12.*

Jia and Zhang, "Fast Human Detection by Boosting Histograms of Oriented Gradients", IEEE, Image and Graphics, 2007. ICIG 2007. Fourth International Conference on, Aug. 22-24, 2007, pp. 683-688.*

(Continued)

*Primary Examiner* — Kakali Chaki
*Assistant Examiner* — Walter Hanchak
(74) *Attorney, Agent, or Firm* — Fitzpatrick, Cella, Harper & Scinto

(57) ABSTRACT

An information processing apparatus creates, for each of a plurality of nodes, a query to be executed for a learning pattern input to the node; inputs a plurality of learning patterns to a root node of the plurality of nodes; executes, for the learning pattern input to each node, the query created for the node; determines whether the query has been effectively executed for the individual learning pattern input to each node; distributes and inputs, to a lower node of each node, an individual learning pattern for which it has been determined in the determining that the query was effectively executed in the node; deletes a learning pattern for which it has been determined in the determining that the query was not effectively executed in each node; and stores an attribute of the learning pattern input to a terminal node of the plurality of nodes in association with the node.

8 Claims, 10 Drawing Sheets

(56) References Cited

OTHER PUBLICATIONS

Pazzani, M., Merz, C., Murphy, P., Ali, K., Hume, T., & Brunk, C. (1994). Reducing Misclassification Costs. Proceedings of the 11th International Conference of Machine Learning, New Brunswick. Morgan Kaufmann, 217-225.*

Lior Rokach and Oded Maimon. Decision trees. In the Data Mining and Knowledge Discovery Handbook, 2005, pp. 165-192.*

Michael Calonder, Vincent Lepetit, Pascal Fua, "Keypoint Signatures for Fast Learning and Recognition", ECCV '08 Proceedings of the 10th European Conference on Computer Vision: Part I, 2008, pp. 58-71.*

C. Silpa-Anan, R. Hartley, "Optimised KD-trees for fast image descriptor matching", Computer Vision and Pattern Recognition, 2008. CVPR 2008. IEEE Conference on, Jun. 23-28, 2008, pp. 1-8.*

U.S. Appl. No. 13/375,448, filed Nov. 30, 2011, Applicants: Yoshii, et al.

U.S. Appl. No. 13/207,190, filed Aug. 10, 2011, Applicants: Yoshii, et al.

U.S. Appl. No. 13/207,143, filed Aug. 10, 2011, Applicants: Tate, et al.

U.S. Appl. No. 13/218,976, filed Aug. 26, 2011, Applicants: Mitarai, et al.

Lepetit, et al., "Keypoint Recognition Using Randomized Trees", IEEE Transactions on Pattern Analysis and Machine Intelligence (2006), pp. 1465 to 1479.

Breiman, et al., "Classification and Regression Trees", Chapman & Hall/CRC (1984).

J. R. Quinlan, "Unknown Attribute Values in Induction", Proceedings of the Sixth International Machine Learning Workshop, Japan, 1989.

Japanese Office Action dated Aug. 15, 2014 corresponding to Japanese Patent Application No. 2010-246747.

* cited by examiner

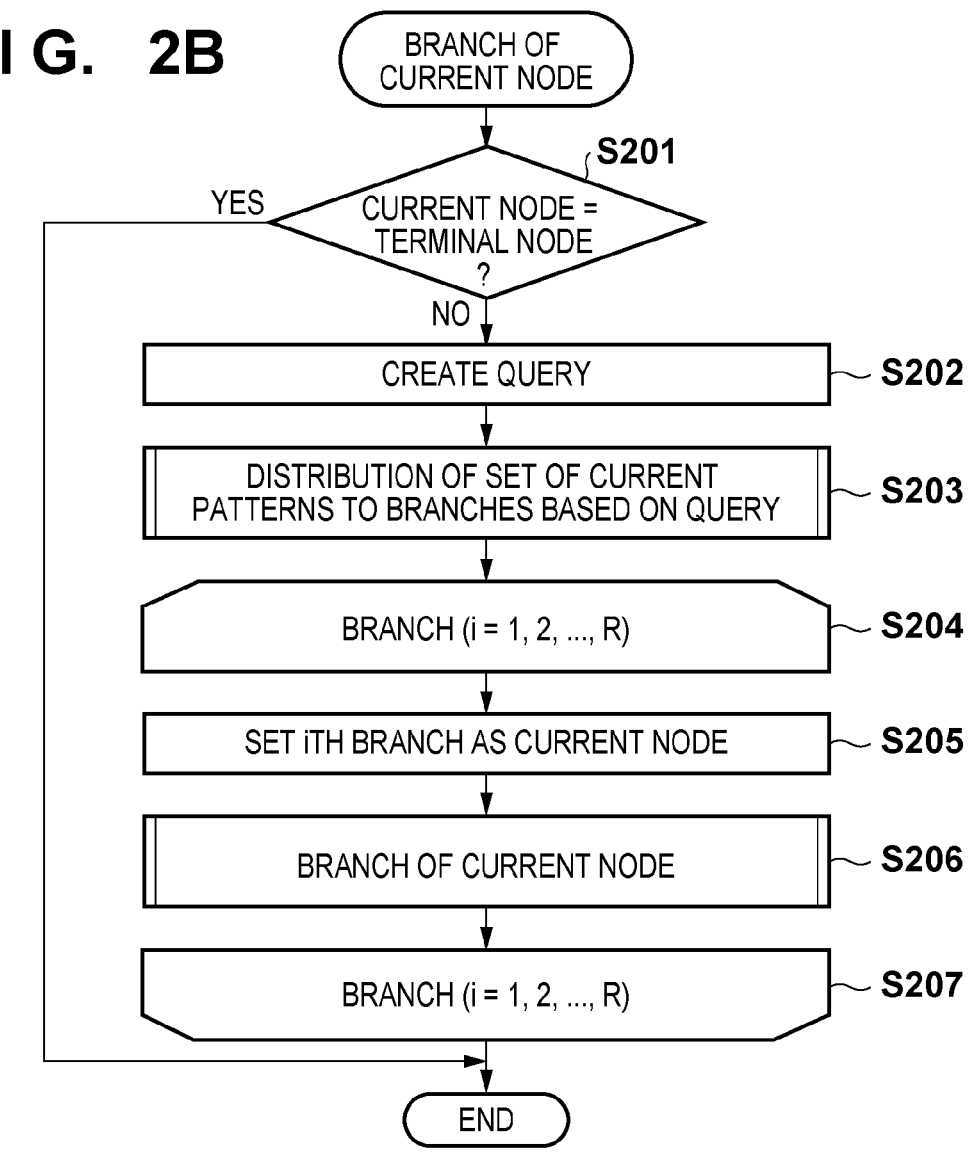

INFORMATION PROCESSING APPARATUS, PROCESSING METHOD THEREFOR, AND NON-TRANSITORY COMPUTER-READABLE STORAGE MEDIUM

BACKGROUND OF THE INVENTION

1. Field of the Invention

The present invention relates to an information processing apparatus, a processing method therefor, and a non-transitory computer-readable storage medium.

2. Description of the Related Art

There is conventionally known machine learning which analyzes a new pattern using learning patterns. There is especially known a pattern recognition method called a classification tree and decision tree, as in "Leo Breiman, Jerome Friedman, Charles J. Stone, and R. A. Olshen, "Classification and Regression Trees", Chapman & Hall/CRC (1984) (to be referred to as literature 1 hereinafter)". Since this method can analyze a pattern using a tree structure at high speed, it has been useful especially when the capability of a computer is low.

By considering a pattern recognition problem as a pattern identification problem, a type of pattern to be identified is referred to as "class". The term "class" will be used in this sense hereinafter.

The classic classification tree and decision tree as described in literature 1 have a disadvantage that the recognition performance is not so high. To overcome this disadvantage, there has been proposed a method of using a set (ensemble) of classification trees as described in U.S. Pat. No. 6,009,199 (to be referred to as literature 2 hereinafter). This technique achieves higher recognition performance by creating L (L is a constant of 2 or larger, and usually falls within the range from 10 to 100) classification trees, and using all of them.

As an example of a technique in which the method of using a set (ensemble) of classification trees is applied to a computer vision, there is known a technique described in "Vincent Lepetit and Pascal Fua, "Keypoint Recognition Using Randomized Trees", IEEE Transactions on Pattern Analysis and Machine Intelligence (2006) pp. 1465 to 1479 (to be referred to as literature 3 hereinafter)". In this literature, an image (32×32 pixels) is considered to be a target, and a classification tree is created based on the luminance value of the image. More specifically, in each node of a classification tree, two points are randomly selected in an image having a predetermined size (32×32 pixels), and their luminance values are compared with each other. This implements branch processing. The literature has reported that it is possible to perform the processing at extremely high speed and the recognition accuracy is sufficiently high.

However, it is impossible to apply, intact, the technique described in literature 3, when the background considerably changes, for example, in the case of recognition of parts laid in a heap or human recognition in the crowd. This is because the luminance value of a background portion in an unknown image is completely different from that in an image to be learned. More specifically, a luminance value unrelated to a target object may inadvertently be used to compare the luminance values of two points in each node of a classification tree. In this case, it is only possible to obtain an unreliable result in pattern recognition when using a (conventional) classification tree. Although an attempt is made to compare the luminance values of two points in a portion where a target object exists, a portion except for the target object may often be referred to.

SUMMARY OF THE INVENTION

The present invention provides a technique which enables to create a dictionary (classifier) for pattern recognition with high recognition accuracy as compared with a conventional technique.

According to a first aspect of the present invention there is provided an information processing apparatus which creates a classifier for classifying an attribute of a pattern using a plurality of nodes consisting of a tree structure, comprising: a creation unit configured to create, for each of the plurality of nodes, a query to be executed for a learning pattern input to the node; an input unit configured to input a plurality of learning patterns to a root node of the plurality of nodes; an execution unit configured to execute, for the learning pattern input to each node, the query created for the node; a determination unit configured to determine whether the query has been effectively executed for the individual learning pattern input to each node; a distribution unit configured to distribute and input, to a lower node of each node, an individual learning pattern for which the determination unit has determined that the query was effectively executed in the node; a deletion unit configured to delete a learning pattern for which the determination unit has determined that the query was not effectively executed in each node; and a storage unit configured to store an attribute of the learning pattern input to a terminal node of the plurality of nodes in association with the node.

According to a second aspect of the present invention there is provided a method of creating a classifier for classifying an attribute of a pattern using a plurality of nodes consisting of a tree structure, comprising: creating, for each of the plurality of nodes, a query to be executed for a learning pattern input to the node; inputting a plurality of learning patterns to a root node of the plurality of nodes; executing, for the learning pattern input to each node, the query created for the node; determining whether the query has been effectively executed for the individual learning pattern input to each node; distributing and inputting, to a lower node of each node, an individual learning pattern for which it has been determined in the determining that the query was effectively executed in the node; deleting a learning pattern for which it has been determined in the determining that the query was not effectively executed in each node; and storing an attribute of the learning pattern input to a terminal node of the plurality of nodes in association with the node.

According to a third aspect of the present invention there is provided a non-transitory computer-readable storage medium storing a computer program for causing a computer, which creates a classifier for classifying an attribute of a pattern using a plurality of nodes consisting of a tree structure, to function as a creation unit configured to create, for each of the plurality of nodes, a query to be executed for a learning pattern input to the node, an input unit configured to input a plurality of learning patterns to a root node of the plurality of nodes, an execution unit configured to execute, for the learning pattern input to each node, the query created for the node, a determination unit configured to determine whether the query has been effectively executed for the individual learning pattern input to each node, a distribution unit configured to distribute and input, to a lower node of each node, an individual learning pattern for which the determination unit has determined that the query was effectively executed in the node, a deletion unit configured to delete a learning pattern for which the determination unit has determined that the query was not effectively executed in each node, and a storage unit configured to store an attribute of the learning pattern input to a terminal node of the plurality of nodes in association with the node.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A and 2B are flowcharts illustrating an example of learning processing by the information processing apparatus 10 shown in FIG. 1;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the following embodiments, a pattern recognition method which analyzes a new pattern based on patterns learned in advance will be explained. As a practical example, using as a pattern an image obtained by capturing a target object, information such as the name, type, three-dimensional existing position, and orientation of the target object is estimated.

A target object indicates an arbitrary object such as a person, animal, organ, automobile, camera, printer, and semiconductor substrate but is not especially limited to them. As a typical application, a measured value obtained by measuring a target physical phenomenon may be used as a pattern.

First Embodiment

Figure 1:
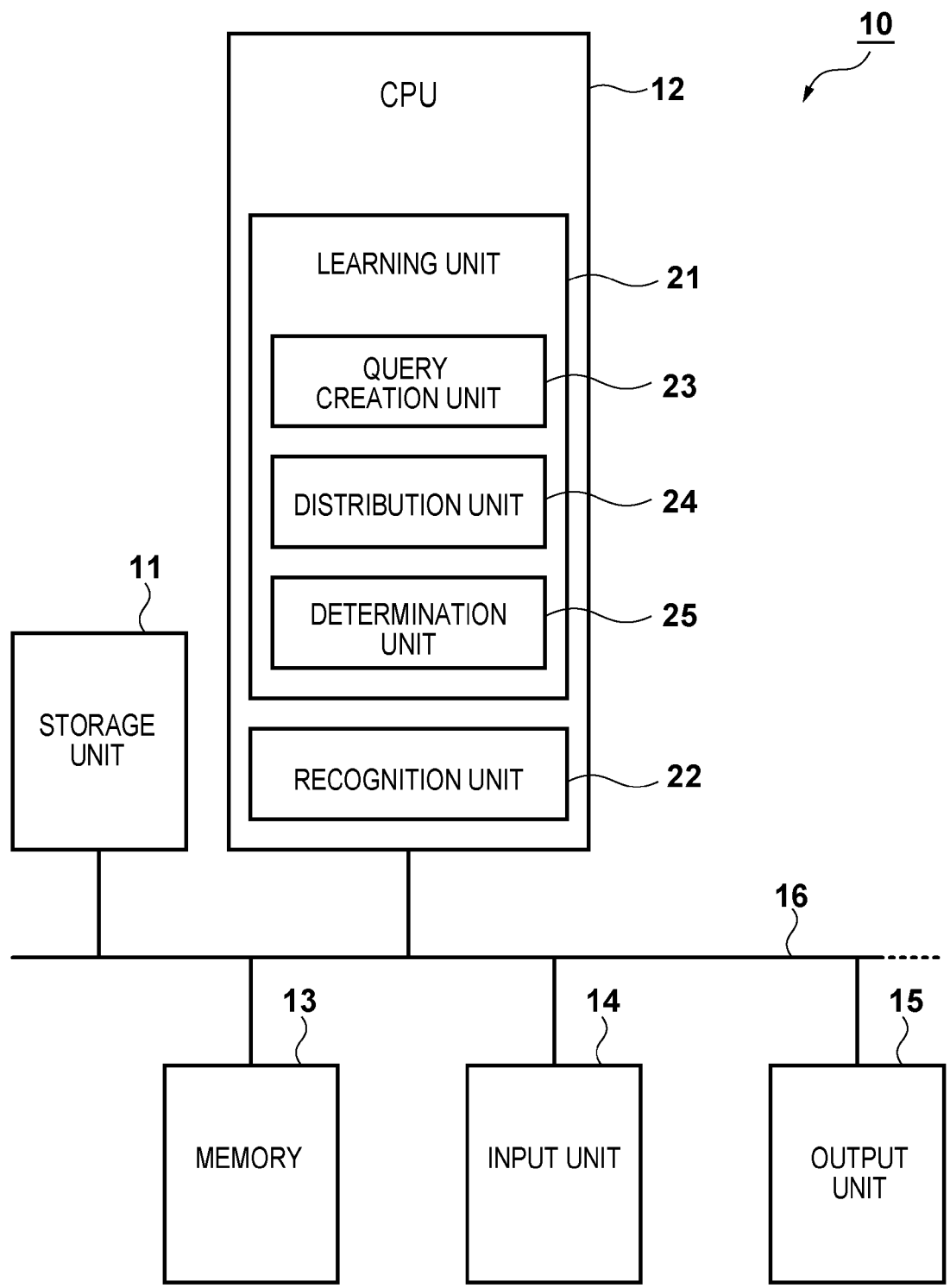
FIG. 1 a block diagram showing an example of the configuration of an information processing apparatus 10 according to an embodiment of the present invention.

FIG. 1 is a block diagram showing an example of the configuration of an information processing apparatus 10 according to an embodiment of the present invention.

The information processing apparatus 10 includes a storage unit 11, a central processing unit (CPU) 12, a memory 13, an input unit 14, and an output unit 15. These components are communicably connected with each other via a bus 16.

The storage unit 11 holds various programs, various learning patterns, and a dictionary created using the learning patterns. The storage unit 11 may hold a recognition result of a new pattern.

The CPU 12 controls the operation of each component of the information processing apparatus 10. The memory 13 temporarily stores a program, subroutine, and data used by the CPU 12. The memory 13 may hold a recognition result of a new pattern derived in processing (to be described later).

The input unit 14 inputs various kinds of information. The unit 14, for example, inputs a new pattern, and processes an instruction input from the user. If, for example, a two-dimensional image is used as a pattern, the input unit 14 is implemented as a camera which captures a target object. Furthermore, the input unit 14 serves as a keyboard, a mouse, or the like to input a trigger for program execution from the user.

The output unit 15 outputs various kinds of information. The unit 15, for example, outputs a pattern recognition result to another apparatus. The output unit 15 may be implemented by, for example, a monitor or the like. In this case, the unit 15 presents a processing result and the like to the user. Note that the output destination may be not a person (user) but a machine such as an apparatus for controlling a robot.

An example of a functional configuration implemented in the CPU 12 will now be explained. As a functional configuration, a learning unit 21 and a recognition unit 22 are implemented in the CPU 12. Note that a functional configuration implemented in the CPU 12 is implemented when, for example, the CPU 12 executes various control programs stored in the memory 13 (or the storage unit 11).

The learning unit 21 learns using a set of learning patterns each containing a target object to undergo pattern recognition. This creates a tree-structured dictionary (or tree-structured classifier) in which individual learning patterns included in the set of learning patterns are distributed to respective nodes. The learning unit 21 includes a query creation unit 23, a distribution unit 24, and a determination unit 25.

The query creation unit 23 creates, for each node, a query to be executed for a learning pattern distributed to the node.

The distribution unit 24 executes, in each node, a corresponding query created by the query creation unit 23, and distributes the individual learning patterns included in the set of learning patterns to lower nodes based on the execution result.

When the distribution unit 24 distributes a learning pattern, the determination unit 25 determines whether a query has been effectively executed for a target object contained in the distribution target learning pattern (the learning pattern distributed to a node). A learning pattern for which, as a result of the determination, it has been determined that a query was not effectively executed is not distributed to a lower node but deleted.

The recognition unit 22 sets, as a root node, a set of patterns to undergo pattern recognition, and executes the queries created for the respective nodes while tracing the tree-structured dictionary created by the learning unit 21. With this operation, pattern recognition is executed.

Learning processing by the information processing apparatus 10 shown in FIG. 1 will be described with reference to FIGS. 2A and 2B. A pattern recognition method using machine learning includes two processes, that is, learning processing (a learning step) of learning based on many learning patterns, and recognition processing (a recognition step) of analyzing a new pattern. FIG. 2A shows an overall operation in the learning processing. FIG. 2B shows details of processing shown in step S103 of FIG. 2A. Note that a routine (processing) shown in FIG. 2B is recursively called.

Figure 4:
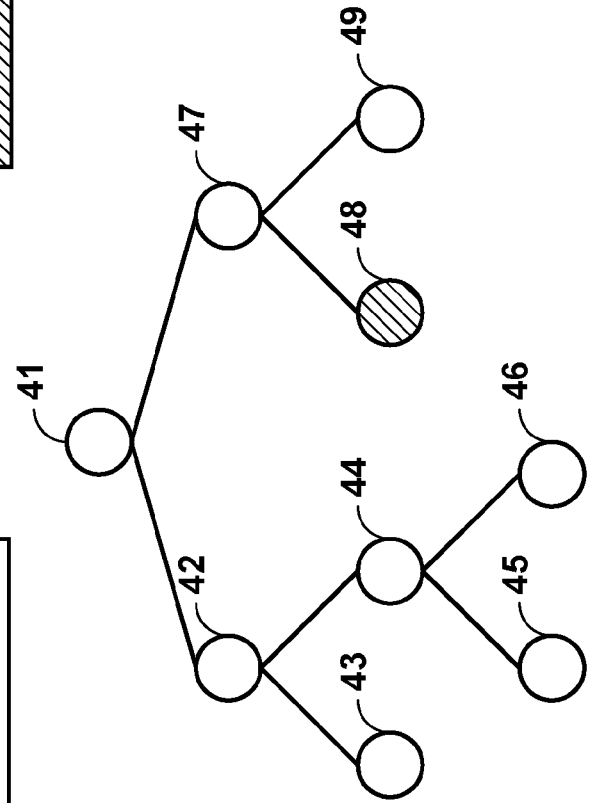
FIG. 4 is a view showing an example of a tree-structured dictionary.

That is, when the information processing apparatus 10 executes the processing shown in FIGS. 2A and 2B, the set of learning patterns is recursively distributed. Consequently, the tree-structured dictionary (or tree-structured classifier) shown in FIG. 4 is obtained. Creation of the tree-structured dictionary or tree-structured classifier is logically equivalent to recursive distribution of the set of learning patterns.

In a conventional classification tree described in literatures 1 to 3, all learning patters remaining in a given node are distributed to (divided among) child nodes (lower nodes). In a set operation expression, let P be a set of learning patterns in a parent node, and C1 and C2 be sets of learning patterns in child nodes. (Assume a binary tree.)

In this case, in the conventional classification tree, $P = C1 \cup C2$ and $C1 \cap C2 = \phi$.

To the contrary, in a method (classification tree creation method) according to this embodiment, when deleting a learning pattern, $P \supset C1 \cup C2$ and $C1 \cap C2 = \phi$. When redundantly distributing a learning pattern to the child nodes, $P = C1 \cup C2$ and $C1 \cap C2 = \phi$. Note that a deletion method (the first embodiment) and a redundant distribution method (the second embodiment) will be described later.

[S101]

Figure 3B:
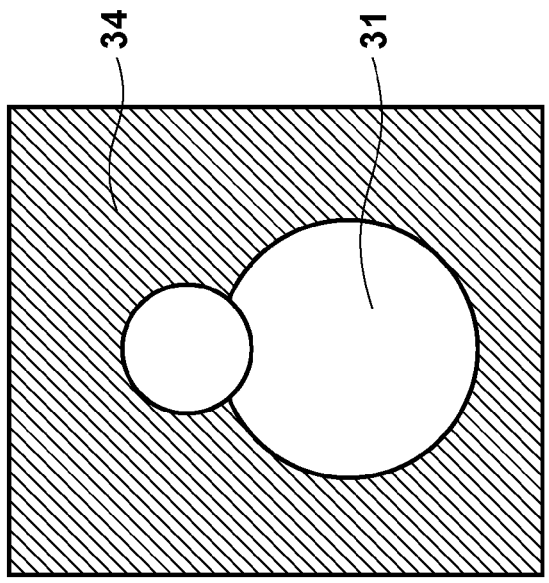
FIGS. 3A and 3B are views each showing a learning pattern example.
Figure 3A:
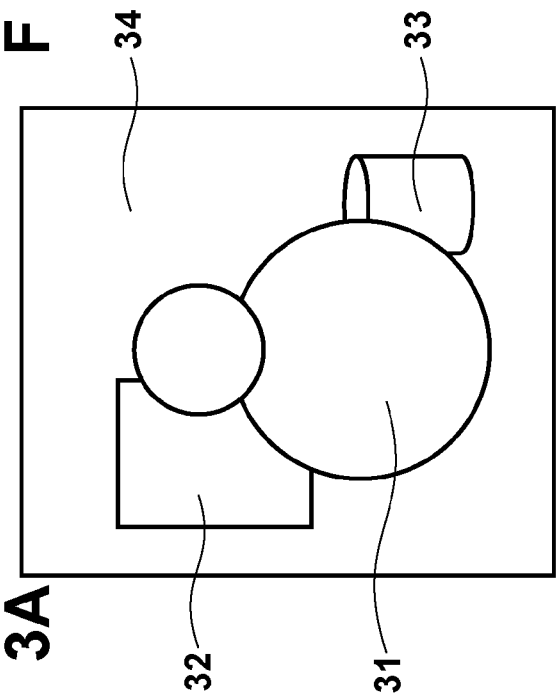

Upon the start of this processing, the learning unit 21 of the information processing apparatus 10 stores all learning patterns in a root node (S101). Learning pattern examples will now be explained with reference to FIGS. 3A and 3B. FIG. 3A shows a raw learning pattern before preprocessing. FIG. 3B shows a learning pattern obtained by deleting the background from the raw learning pattern.

The learning pattern shown in FIG. 3A contains an hourglass-shaped target object 31, and a region (background region) 34 contains objects 32 and 33 other than the target object. In the learning pattern shown in FIG. 3B, −1 is set as the luminance value of the background region 34 (a portion except for the target object 31). That is, an invalid value is set as the luminance value. Note that the luminance value of the background region 34 may be replaced with a random value.

[S102]

The learning unit 21 of the information processing apparatus 10 sets the root node as a current node (S102) after storing the learning patterns. The root node indicates a node existing at the root of the tree structure (tree), and indicates a node 41 shown in FIG. 4. The current node indicates a node being currently processed in the learning processing and recognition processing.

[S103]

The learning unit 21 of the information processing apparatus 10 calls a subroutine (current node branch processing) shown in FIG. 2B to branch the current node (S103), which will be described in detail later. When the processing of the subroutine is completed, the learning processing ends. Note that the current node moves according to the order of reference numerals 41 to 49 shown in FIG. 4.

The processing of the subroutine (current node branch processing) shown in step S103 of FIG. 2A will be explained in detail with reference to FIG. 2B.

[S201]

Upon start of this processing, the learning unit 21 of the information processing apparatus 10 determines whether the current node is a terminal node. A terminal node indicates a null node or a leaf node. A null node represents a node containing no learning pattern, and a leaf node represents a node in which a set of remaining learning patterns meets a predetermined condition. As a predetermined condition, for example, "the number of types of class (pattern to be identified) existing in the current node is K (for example, K=10) or smaller" is used. In this case, if K=1, the condition is "the current node purely contains only one class". Alternatively, for example, "an information amount entropy is calculated based on learning patterns existing in the current node, and the thus obtained value is not larger than a predetermined threshold" may be used as a predetermined condition. In this case, if the threshold is set to 0, this condition is equivalent to "the current node purely contains only one class". If, for example, the purpose of pattern recognition is class determination, a terminal node holds the probability that each class exists. As described above, if a condition for a leaf node is "the current node purely contains only one class", the terminal node stores the number of the remaining class. Alternatively, if the purpose of pattern recognition is so-called recurrence, a terminal node stores a given estimated value or estimated vector.

In FIG. 4, the nodes 43, 45, 46, and 49 are leaf nodes, and the node 48 is a null node. That is, if it is determined in step S201 that the current node is one of the nodes 43, 45, 46, 48, and 49 (YES in step S201), the processing of the subroutine ends.

If it is determined in step S201 that the current node is not a terminal node (NO in step S201), the current node branch processing is executed (S202 to S207). In processing in step S206, the subroutine shown in FIG. 1B is recursively called. As a result of the processing, the set of learning patterns has been recursively distributed.

[S202]

Prior to the current node branch processing, the query creation unit 23 of the information processing apparatus 10 creates a query to be executed in the current node (S202). The query creation processing is performed using a set of learning patterns remaining in the current node (a set of learning patterns in the current node). As described in literature 1, a query may be created by measuring the efficiency of each query using the Gini coefficient, and selecting a query with a highest efficiency. As described in literatures 2 and 3, a query may be created by randomly selecting dimensions and reference points within an image, and making determination based on the values of the reference points and the dimensions. As a relatively simple query, a query which selects two points (two dimensions) in an image (or feature vector), and compares the values of the points with each other to distribute the two points to two branches (nodes) is used. By assuming this type of query, the following description will be given.

[S203]

When the query creation processing is complete, the distribution unit 24 of the information processing apparatus 10 distributes the set of current patterns (learning patterns remaining in the current node) to branches (nodes) based on the query (S203). The number of distributions may be different for each node but the same value is generally used for all the nodes. In the processing in step S203, for example, if the number R of distributions is 2, a so-called binary tree is created and a classification tree having the form shown in FIG. 4 is obtained. The distribution processing in step S203 will be described in detail later.

[S204 to S207]

Processing in steps S204 to S207 is executed for each branch to which a learning pattern is distributed. More specifically, the ith branch (node) is set as a current node (S205), and the subroutine shown in FIG. 1B is recursively called (S206). This processing is repeated until the variable i reaches the number (R) of distributions.

The processing of the subroutine in step S203 shown in FIG. 2B will be described in detail with reference to FIG. 5.

[S301 to S306]

Assume that the set of learning patterns remaining in the current node includes n learning patterns. In this case, the learning unit 21 of the information processing apparatus 10 executes processing (a loop for a learning pattern i) in steps S302 to S305 n times. In this loop processing, the determination unit 25 of the information processing apparatus 10 determines whether an individual learning pattern i is appropriate (S302). If, as a result of the determination, the learning pattern i is appropriate (YES in step S303), the distribution unit 24 of the information processing apparatus 10 distributes the learning pattern i to a branch (node) based on the query (S304). Alternatively, if the learning pattern i is inappropriate (NO in step S303), the distribution unit 24 of the information processing apparatus 10 deletes the learning pattern i (S305).

An overview of the processing, in step S302 of FIG. 5, of determining whether the learning pattern i is appropriate will be described with reference to FIGS. 6A and 6B. Assume that two learning patterns remain in the current node (FIGS. 6A and 6B).

Figure 6A:
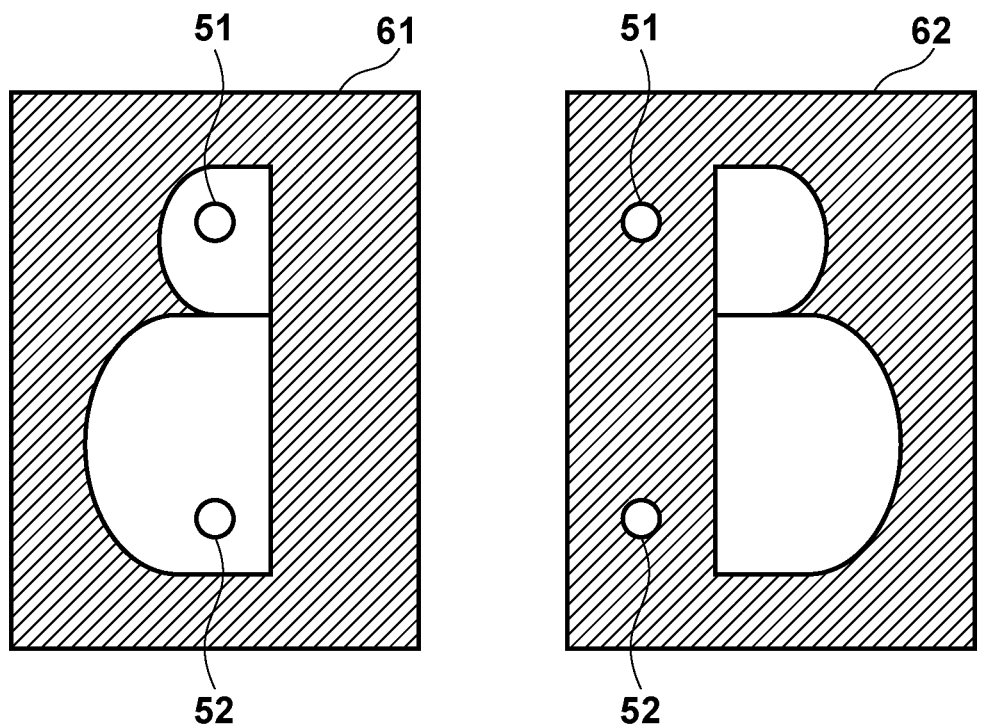
FIGS. 6A and 6B are views showing an overview of processing in step S302 shown in FIG. 5.

Assume, for example, that two points 51 and 52 shown in FIG. 6A are selected as points (reference points) to be compared in this node. Assume also that an appropriateness condition is "both the reference points are in a target object". In this case, since a learning pattern 61 is appropriate, it is distributed to each branch (node) based on a query. For a learning pattern 62, this pattern is inappropriate, and is therefore deleted.

Figure 6B:
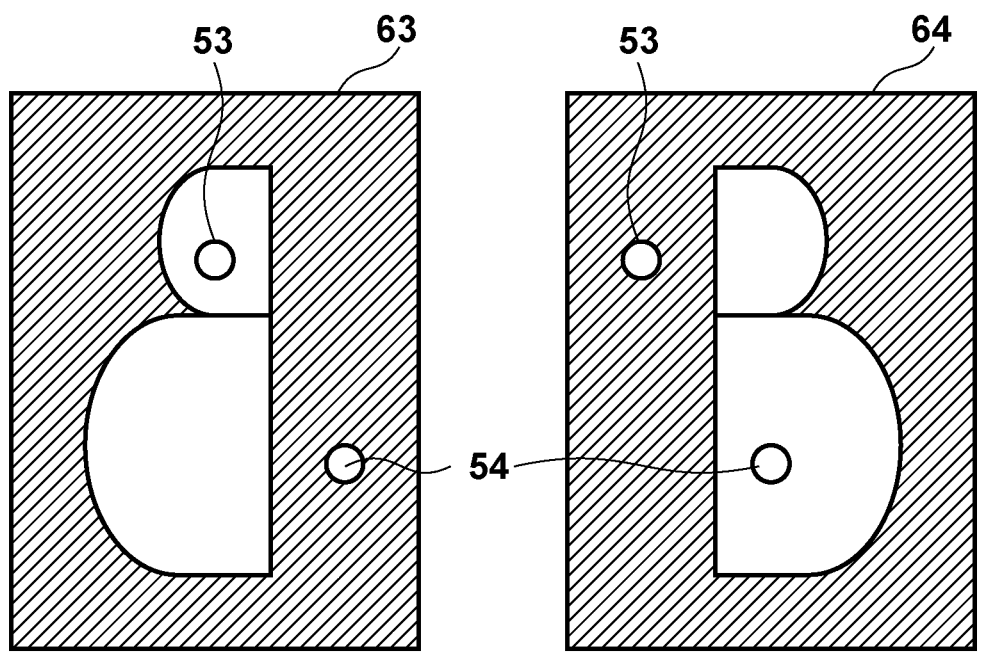

As another example, assume that two points 53 and 54 are selected as points (reference points) to be compared in this node, as shown in FIG. 6B. In this case, if an appropriateness condition is "both the reference points are in a target object", both of learning patterns (63 and 64) shown in FIG. 6B are inappropriate. Alternatively, if an appropriateness condition is "either of the reference points is in a target object", both of the learning patterns (63 and 64) shown in FIG. 6B are appropriate. If an appropriateness condition is "either of the reference points is in the upper portion of a target object", the learning pattern 63 is appropriate but the learning pattern 64 is inappropriate.

A method of deleting a learning pattern will be explained. Assume that the learning patterns shown in FIG. 6A remain in the node 47 shown in FIG. 4. If an appropriateness condition is "both the reference points are in a target object", the learning pattern 61 is appropriate, and is distributed, based on a query, to the node 49 which becomes a leaf node. On the other hand, the learning pattern 62 is inappropriate, and is therefore deleted. Consequently, the node 48 which is a brother node of the node 49 becomes a null node.

Figure 7A:
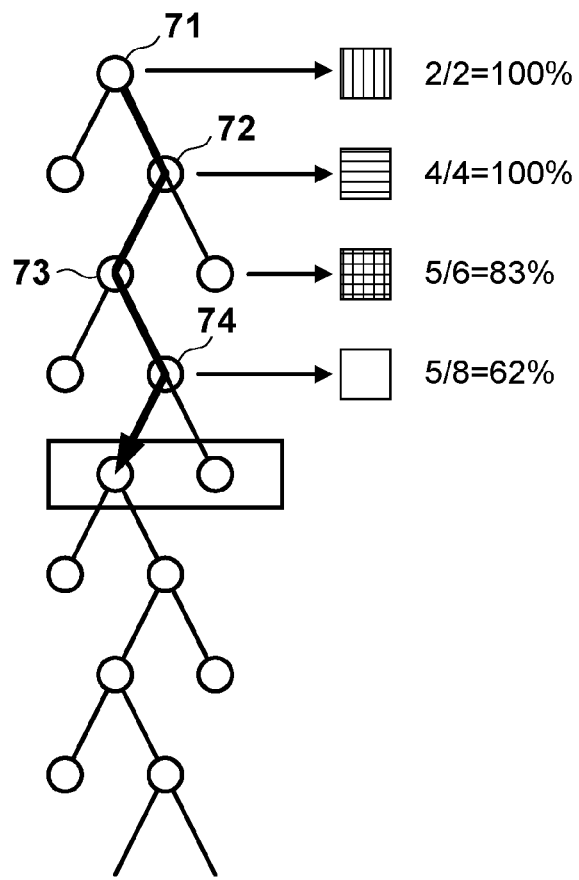
FIGS. 7A and 7B are views showing an overview of a modification of the processing in step S302 shown in FIG. 5.
Figure 7B:
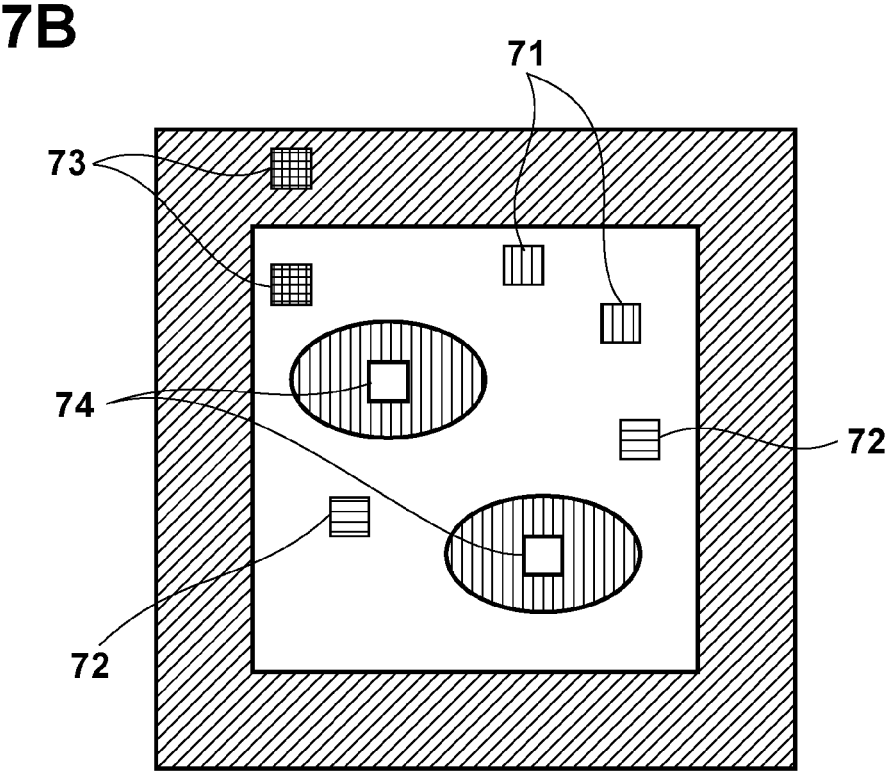

FIGS. 7A and 7B show a relatively complicated example of an appropriateness condition for a learning pattern. In the above description, whether a learning pattern is appropriate is determined based on a result of executing a final (immediately preceding) query. To the contrary, in the example shown in FIGS. 7A and 7B, whether a learning pattern is appropriate is determined using the past history of queries until now. FIG. 7A shows a tree structure being created. FIG. 7B shows a learning pattern for the current node. The learning pattern shown in FIG. 7B has two large holes in a rectangular part.

Assume that queries have been executed in the order of nodes 71 to 74 by starting with a root node. Reference points used in executing the queries are also shown in FIG. 7B. Assume that an appropriateness condition is "the probability (ratio) that reference points for past queries are in a target object is equal to or larger than a predetermined threshold (in this case, 0.8)".

In this case, as shown in FIG. 7B, both reference points for the node 71 are in a target object, which means the probability is 100%. The nodes 72 to 74 have probabilities of 100%, 83%, and 62%, respectively. As a result, in the learning pattern shown in FIG. 7B, the nodes 71 to 73 are appropriate, and when the query for the node 74 is executed, the node 74 is determined to be the first inappropriate node, and is therefore deleted.

As described above, the user can flexibly set an appropriateness condition based on "whether a corresponding query is valid". With this processing, only valid queries exist in a tree structure. Especially when reference points for a query are randomly selected, an invalid query for a given learning pattern may be executed. In this case, by deleting the learning pattern from a node (tree structure), only valid queries remain in the tree structure as a whole.

Although a query which compares the values (luminance values) of two points has been described above, a query which determines whether the difference between the values (luminance values) of two points is equal to or larger than a predetermined value may be applicable. Alternatively, a query which determines whether the value (luminance value) of one point is equal to or larger than (the value (luminance value) of the other point+a predetermined value) may be used. Furthermore, a query which selects n points instead of two points, and determines whether the total of the luminance values of the selected points is equal to or larger than a predetermined value may be possible. More generally, a query which selects n points, and determines whether the value of a predetermined function using, as input values, the luminance values (vectors) of the n points is equal to or larger than a given value may be used.

Figure 8:
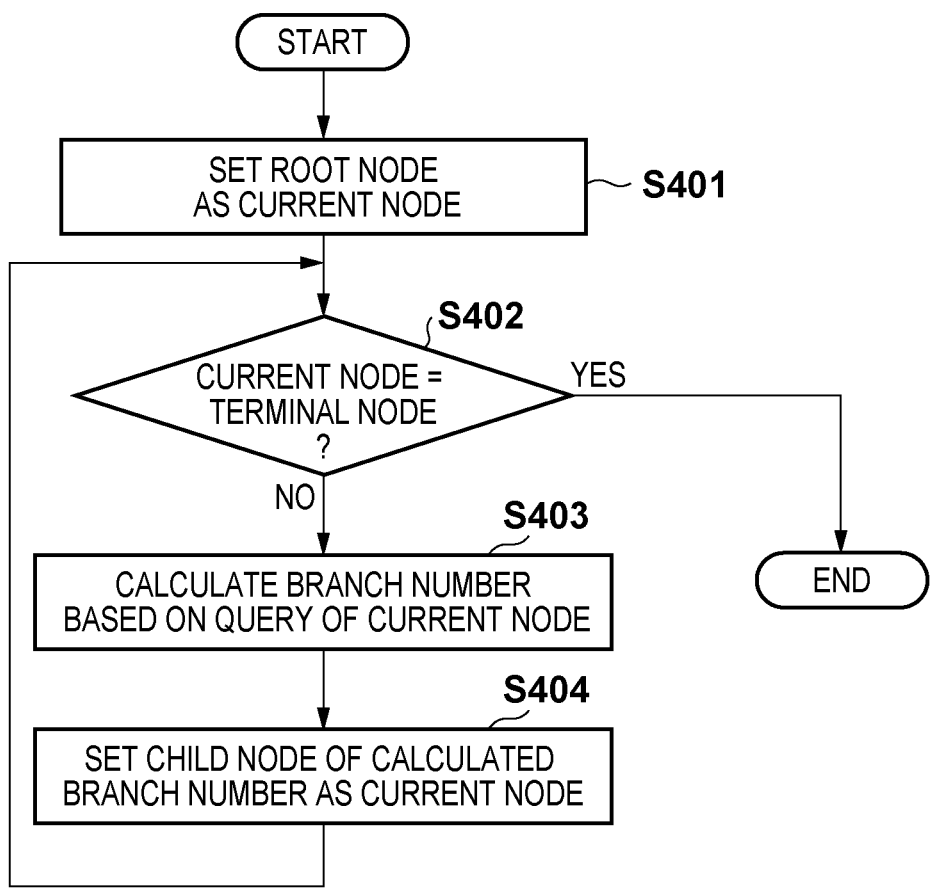
FIG. 8 is a flowchart illustrating an example of recognition processing by the information processing apparatus 10 shown in FIG. 1.

The recognition processing by the information processing apparatus 10 shown in FIG. 1 will be described with reference to FIG. 8. That is, a processing procedure of detecting a new unlearned learning pattern using the tree-structured dictionary (or tree-structured classifier) created in the processing in FIG. 1 will be explained.

[S401, S402]

The recognition unit 22 of the information processing apparatus 10 sets a root node as a current node (S401). The recognition unit 22 of the information processing apparatus 10 determines whether the current node is a terminal node (a null node or leaf node). If the current node is a terminal node (YES in step S402), the recognition unit 22 of the information processing apparatus 10 sets information about the terminal node as a recognition result, and ends this processing.

[S402~S404]

Alternatively, if the current node is not a terminal node (NO in step S402), the recognition unit 22 of the information processing apparatus 10 calculates a branch number (node number) based on a query stored in the current node (S403). After a child node of the calculated branch number is set as a current node (S404), the process returns to the determination processing in step S402. Note that this processing follows the tree structure from a root node to a terminal node (a null node or leaf node).

According to this embodiment, as described above, the validity of a query executed in each node is determined, and then a learning pattern for which a result of executing the query is invalid is deleted. In the tree-structured dictionary, therefore, appropriate learning patterns remain and unnecessary learning patterns have been deleted, which means that only valid queries remain.

While suppressing an increase in size, it is possible to create a dictionary holding valid information for pattern recognition. In recognition processing using the dictionary, therefore, it is possible to recognize a target object with high accuracy at high speed as compared with a conventional technique. This is especially effective when objects similar to a target object are superimposed on the background, for example, in the case of recognition of parts laid in a heap or human detection in the crowd.

Second Embodiment

The second embodiment will be described next. In the first embodiment, in the step (learning processing) of creating a tree-structured dictionary, if a learning pattern does not meet an appropriateness condition, it is deleted. To the contrary, in the second embodiment, a case in which, if a learning pattern does not meet an appropriateness condition, it is redundantly distributed to all child nodes will be described. Note that the configuration and overall operation of an information processing apparatus 10 according to the second embodiment are the same as those in the first embodiment, and a description thereof will be omitted. Different parts will be mainly explained here.

Figure 5:
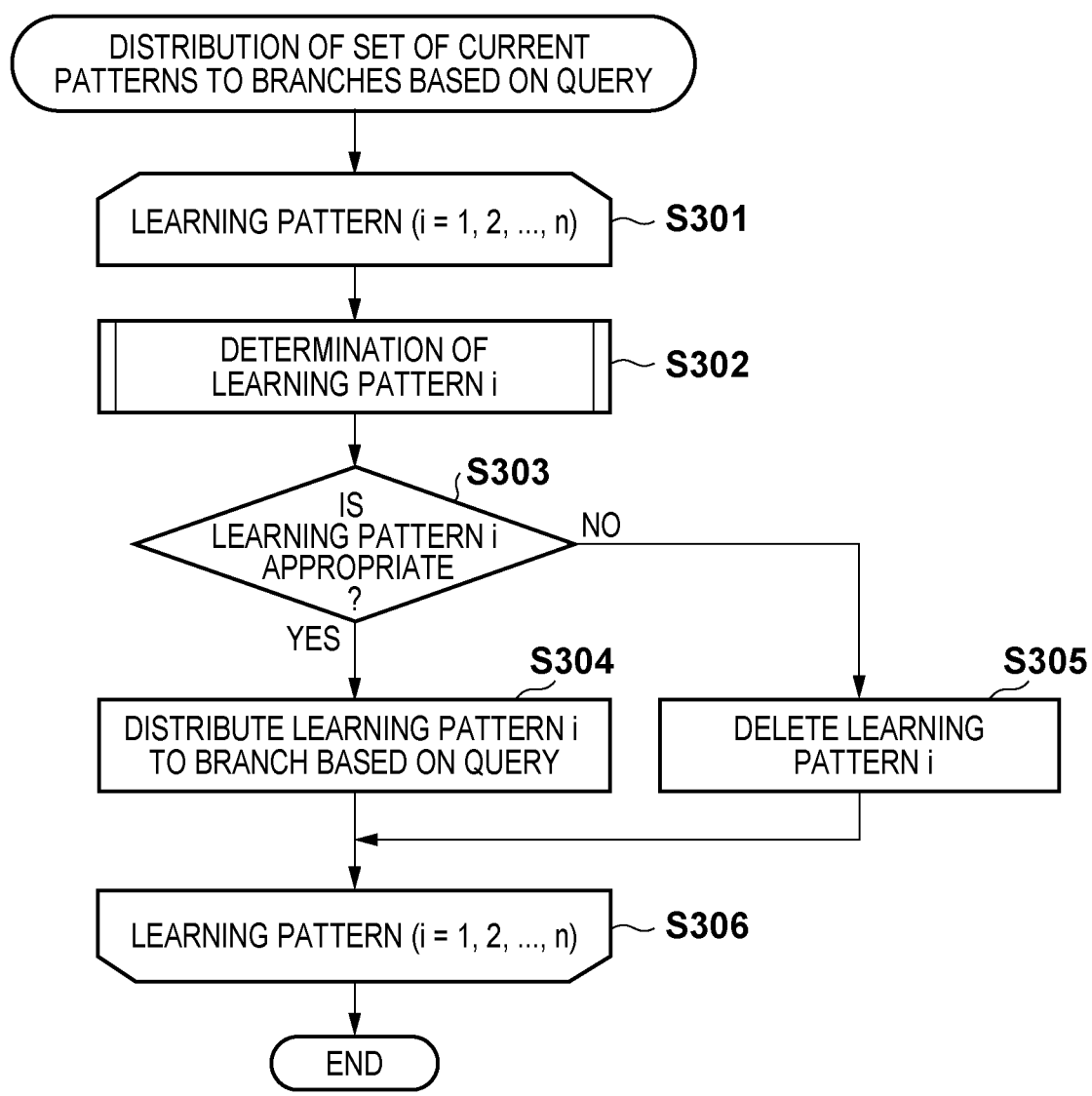
FIG. 5 is a flowchart illustrating details of processing in step S203 shown in FIG. 2B.

There is a difference between the first and second embodiments in processing in step S305 shown in FIG. 5. In the second embodiment, in determination processing in step S302, if a learning pattern i is inappropriate (NO in step S303), it is not deleted but distributed to all branches.

This processing will be described in detail using FIGS. 4 and 6A. Assume, for example, that learning patterns 61 and 62 shown in FIG. 6A remain in a node 42 shown in FIG. 4. If an appropriate condition is "both reference points are in a target object", the learning pattern 61 is appropriate, and is therefore distributed to a node 44 based on a query. On the other hand, the learning pattern 62 is inappropriate, and is therefore distributed to both the branches of a node 43 and the node 44 (both nodes). Consequently, the node 43 becomes a leaf node containing only the learning pattern 62. The node 44 is still an internal node (node which is neither a leaf node nor a null node) containing the two learning patterns 61 and 62, and continues node branch processing.

According to the second embodiment, as described above, if a learning pattern in a predetermined node does not meet the appropriateness condition, it is distributed to all child nodes, thereby enabling to invalidate the effect of the last executed query. This can create a dictionary holding valid information for pattern recognition.

In addition to the configuration of the second embodiment, a learning pattern may be deleted based on a history of queries until now (see FIGS. 7A and 7B used for explaining the first embodiment). That is, while redundantly distributing, to all child nodes, a learning pattern which does not meet the appropriateness condition, the learning pattern may be deleted based on its history.

Third Embodiment

The third embodiment will be described next. In the first embodiment, a case in which one tree-structured dictionary (or tree-structured classifier) is created, and a pattern is analyzed using the one tree-structured dictionary and the like has been explained. To the contrary, in the third embodiment, a case in which a plurality of tree-structured dictionaries (or tree-structured classifiers) are created and a pattern is analyzed using the plurality of tree-structured dictionaries and the like will be described. Note that a case in which a plurality of tree-structured classifiers are created and used is exemplified.

Figure 9A:
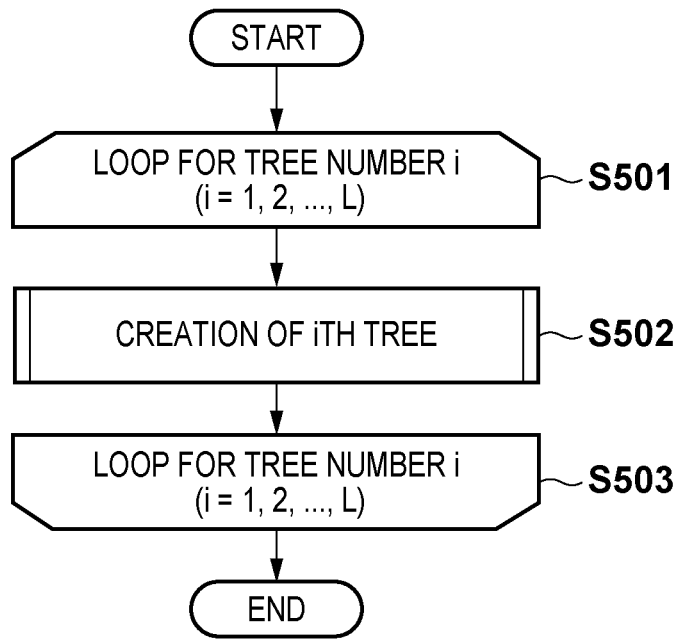
FIGS. 9A and 9B are flowcharts illustrating an example of learning processing according to the third embodiment.
Figure 9B:
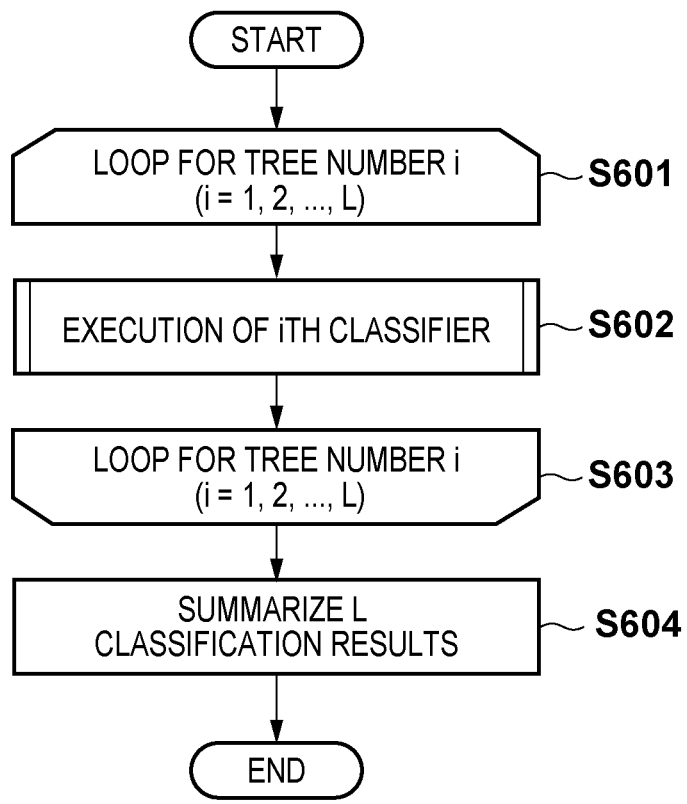

FIG. 9A is a flowchart illustrating learning processing according to the third embodiment. FIG. 9B is a flowchart illustrating recognition processing according to the third embodiment. Assume that the number of tree-structured classifiers is L. L generally ranges from about 10 to 100 but assumes an arbitrary constant of 2 or larger. As L becomes larger, the dictionary size increases and the recognition rate improves. As L becomes smaller, the dictionary becomes compact and the recognition rate lowers.

In the learning processing shown in FIG. 9A, the ith tree structure (tree) creation processing is performed (S502). This processing is repeated while the tree number i falls within the range from 1 to L (S501 to S503). In the ith tree creation processing (ith classifier creation processing) shown in step S502, the processing (subroutine) explained using FIG. 2A is called and executed. In this loop processing, the subroutine shown in step S502 is completely individually called. That is, the processing in steps S501 to S503 has no problem even if it is executed in multithread or multitask. The processing may be performed using a plurality of computers. The processing of creating a plurality of (L) tree-structured classifiers shown in FIG. 9A is suitable for parallel computation, and can be executed at extremely high speed by increasing the degree of parallelism.

The recognition processing according to the third embodiment will be described with reference to FIG. 9B.

In the recognition processing, execution processing for the ith classifier is performed (S602). This processing is repeated while the tree number i falls within the range from 1 to L (S601 to S603). In the execution processing for the ith classifier shown in step S602, the processing (subroutine) explained using FIG. 8 is called and executed.

After that, the results of the L classifiers which have been finally obtained are summarized (S604). In this processing, L recognition results are summarized to obtain a final pattern recognition result. Various summarization methods can be used. If, for example, a pattern recognition task serves as a class determination task, the processing (a processing result of the classifier) shown in FIG. 8 presents the existence probability vector of each class. In this case, as the summarization processing in step S604, an arithmetic mean or geometric mean of the L existence probability vectors can be used. The recognition processing shown in FIG. 9B is also suitable for parallel processing similarly to the learning processing shown in FIG. 9A. Therefore, increasing the degree of parallelism raises the processing speed.

According to the third embodiment, as described above, it is possible to create a plurality of tree-structured dictionaries (or tree-structured classifiers), and execute recognition processing using them. It is, therefore, possible to execute learning processing and recognition processing in parallel, thereby increasing the processing speed.

Fourth Embodiment

The fourth embodiment will be described next. In the fourth embodiment, a case in which an image is used as a learning pattern will be explained. An overview of processing according to the fourth embodiment will be described first with reference to FIGS. 10A and 10B.

Figure 10A:
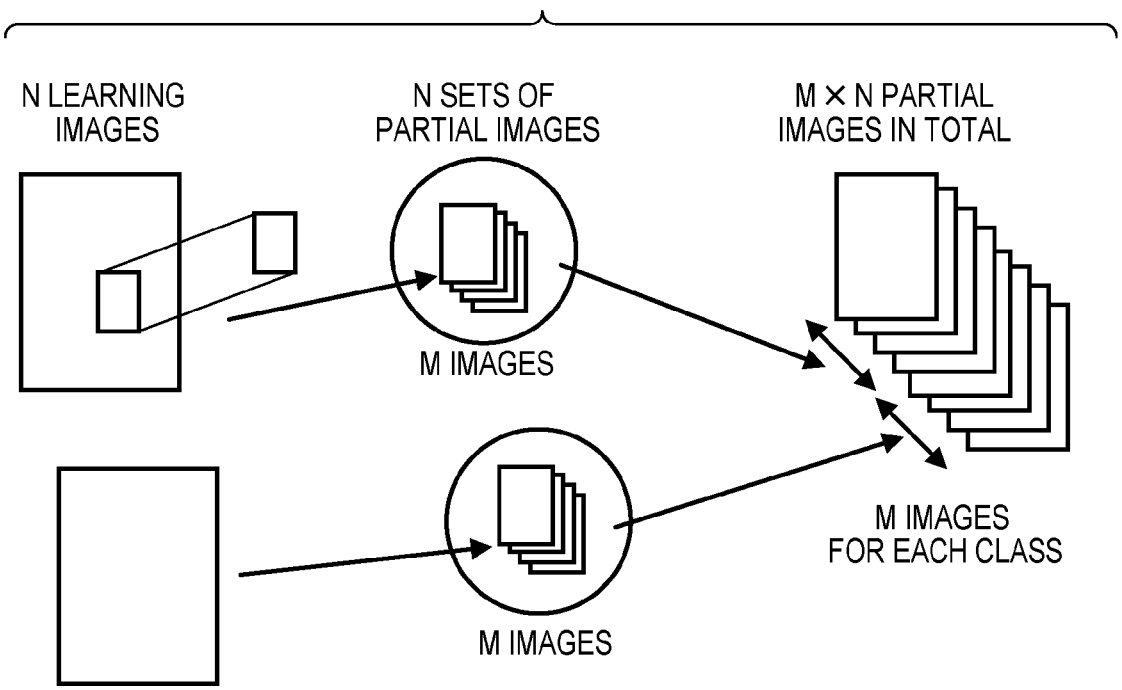
FIGS. 10A and 10B are views showing an overview of processing according to the fourth embodiment.

In the fourth embodiment, as shown in FIG. 10A, M partial images are extracted from one learning image. These are referred to as a set of partial images. The partial images included in the set of partial images need not overlap each other but it is desirable to exhaustively extract partial images from the original image (learning image) so that they overlap each other.

Assume, for example, that a learning image has a size of 100×100 pixels and a partial image has a size of 50×50 pixels. In this case, if an intermediate position (so-called sub-pixel) between pixels is not considered, the number of partial images extracted from one learning image is 2601 (=51×51). Note that if partial images which do not overlap each other are extracted, the number of obtained partial images is 2×2=4 in total.

The set of partial images shown in FIG. 10A desirably includes as many partial images as possible. As a final set of partial images, M partial images are obtained for each class and a total of M×N partial images are obtained.

Figure 10B:
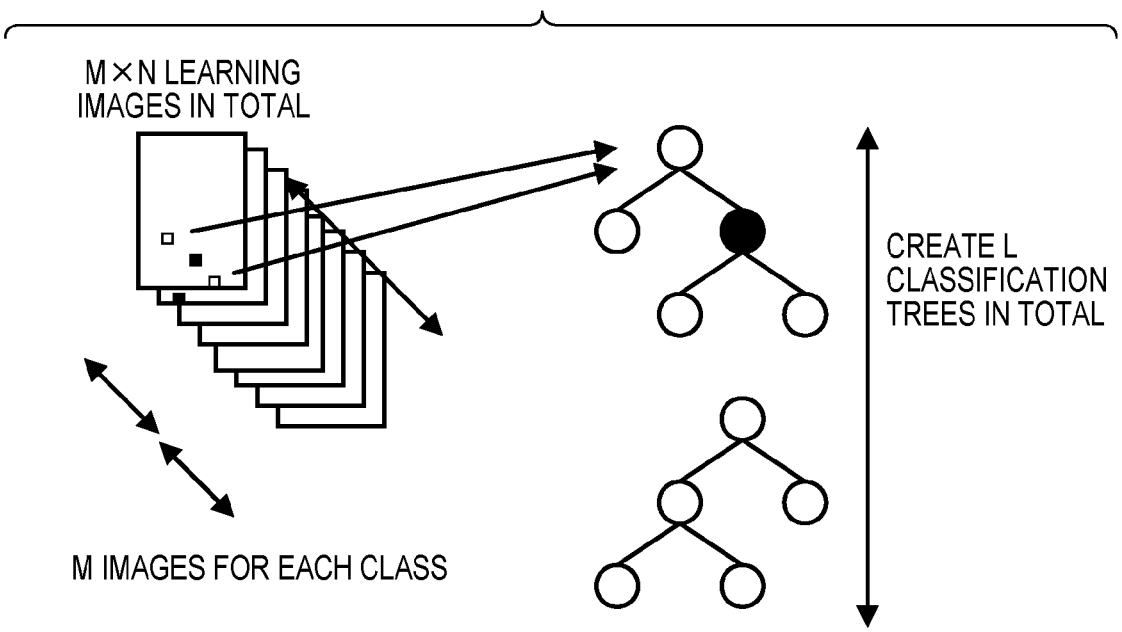

Then, a binary tree is created using the set of partial images (FIG. 10B). In this case, L classification trees exist in total, and therefore, classification tree creation processing is executed L times. In creating a classification tree, two reference points (pixels) are selected in each node of the classification tree. By comparing the luminance values of the pixels, the set of partial images is recursively distributed.

Figure 11A:
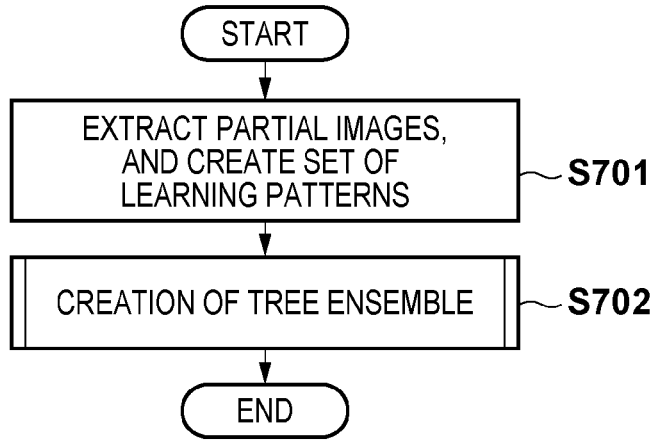
FIGS. 11A and 11B are flowcharts illustrating an example of a processing procedure by the information processing apparatus 10 according to the fourth embodiment.

FIG. 11A is a flowchart illustrating an example of a learning processing procedure according to the fourth embodiment.

Upon start of this processing, a learning unit 21 of an information processing apparatus 10 extracts a plurality of partial images from a learning image, and creates a set of learning patterns (S701). That is, the processing shown in FIG. 10A is executed.

The learning unit 21 of the information processing apparatus 10 then creates a tree ensemble (S702). That is, the processing shown in FIG. 10B is performed. More specifically, the processing shown in FIG. 9A is called as a subroutine.

In the schematic views shown in FIGS. 10A and 10B, assume that the M partial images extracted from one learning image are identified with each other, and the number of classes in the learning processing is N. To the contrary, it is possible to discriminate among the M partial images using positions within the learning image, and consider that there exist M×N classes (types of class) in total.

Figure 11B:
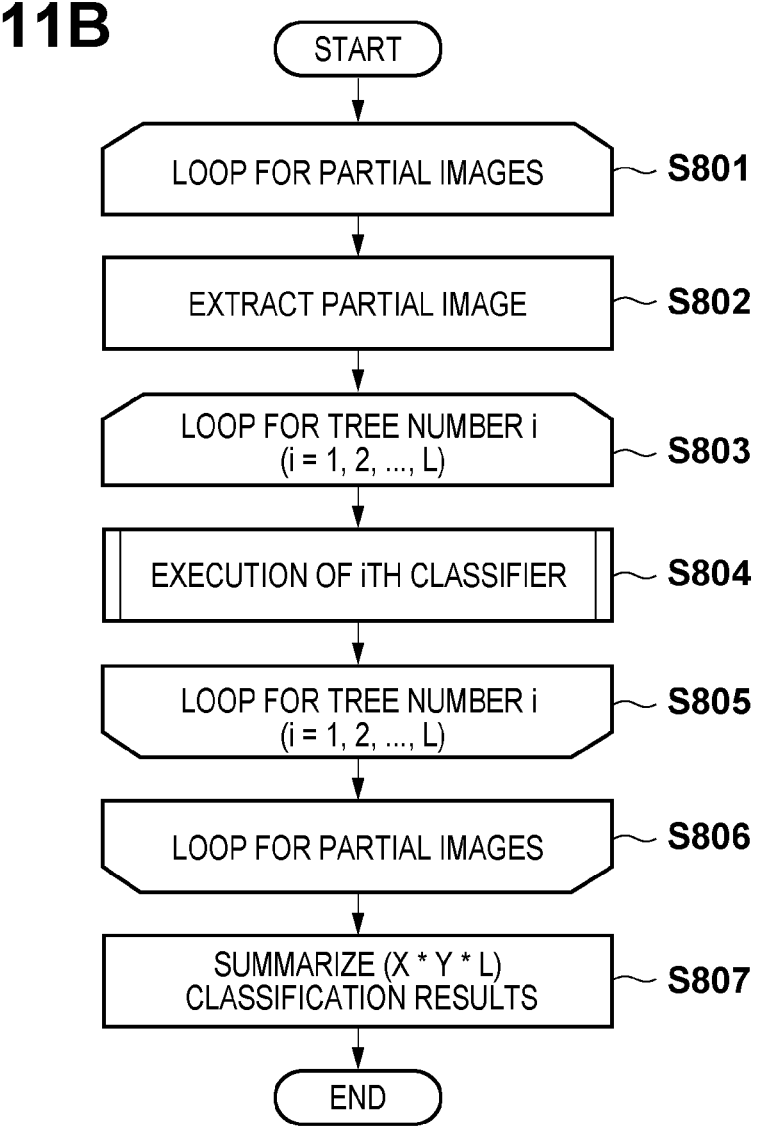

FIG. 11B is a flowchart illustrating an example of a recognition processing procedure according to the fourth embodiment. In an example of recognition processing, assume that a new input image has a size of 1280×1024 pixels and a partial image has a size of 50×50 pixels. In this case, if sub-pixels are not considered, 1,200,225 (1231×975) partial images exist within the new input image (X=1280−50+1, Y=1024−50+1). Basically, loop processing shown in steps S801 to S806 is repeated the number of times, which is equal to the number of partial images. Note that it is unnecessary to repeat the processing 1,200,225 times and the processing speed may be increased by skipping intermediate processes.

Upon start of this processing, a recognition unit 22 of the information processing apparatus 10 executes the loop processing shown in steps S801 to S806 to extract partial images (S802). In the loop for the partial images, a loop for tree numbers (S803 to S805) is executed. That is, a double loop is executed. Since the two loops are performed independent of each other, the inner loop and outer loop may be swapped. The execution processing for the ith classifier shown in step S804 is executed at the deepest level of the loop. This processing calls the processing shown in FIG. 8 as a subroutine.

When the loop processing in steps S801 to S805 is complete, the recognition unit 22 of the information processing apparatus 10 summarizes (X*Y*L) classification results. With this operation, a final recognition result is obtained (S807). Consequently, a learning image with a size of 100×100 pixels existing within the input image with a size of 1280×1024 pixels is detected. As the summarization processing, an arithmetic mean or geometric mean of the existence probability vectors of classes can be used. It is also possible to obtain, by voting, the existing position of the above-described learning image using offsets each holding the position of a partial image within the learning image.

According to the present invention, it is possible to create a dictionary for pattern recognition with high recognition accuracy as compared with the conventional technique.

The representative embodiments of the present invention have been described above. The present invention, however, is not limited to the above-described embodiments shown in the accompanying drawings, and can be implemented by modifying, as needed, the embodiments within the spirit and scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-246747 filed on Nov. 2, 2010, which is hereby incorporated by reference herein in its entirety.

What is claimed is:

1. An information processing apparatus which creates a classifier for classifying an attribute of a pattern image using a plurality of nodes consisting of a tree structure, comprising:
   an input unit configured to input a plurality of learning pattern images to each of the plurality of nodes, each of the plurality of learning pattern images including a target object;
   a selection unit configured to select, from each of the plurality of learning pattern images inputted to the node, at least one point;
   a determination unit configured to determine, for each of the plurality of learning pattern images inputted to the node, whether the selected point belongs to a region of the target object in the learning pattern image;
   a distribution unit configured to distribute and input, to a lower node of each node, a learning pattern image for which said determination unit has determined that the selected point belongs to the region;
   a deletion unit configured to delete a learning pattern image for which said determination unit has determined that the selected point does not belong to the region; and
   a storage unit configured to store an attribute of the learning pattern image input to a terminal node of the plurality of nodes in association with the node, wherein said selection unit selects, from each of the plurality of learning pattern images inputted to the node, a plurality of points, said determination unit determines, for each of the plurality of learning pattern images inputted to the node, whether a ratio of the selected plurality of points belonging to the region of the target object in the learning pattern image is larger than a threshold, said distribution unit distributes and inputs, to a lower node of each node, a learning pattern image for which said determination unit has determined that the ratio of the selected plurality of points belonging to the region of the target object in the learning pattern image is larger than the threshold, and said deletion unit deletes a learning pattern image for which said determination unit has determined that the ratio of the selected plurality of points belonging to the region of the target object in the learning pattern image is not larger than the threshold.

2. The apparatus according to claim 1, further comprising:
a recognition unit configured to input, to a root node, a set of patterns to undergo pattern recognition, and to recognize a pattern by executing a query created for each node while tracing the plurality of nodes.

3. An information processing apparatus which creates a classifier for classifying an attribute of a pattern image using a plurality of nodes consisting of a tree structure, comprising:
an input unit configured to input a plurality of learning pattern images to each of the plurality of nodes, each of the plurality of learning pattern images including a target object;
a selection unit configured to select, from each of the plurality of learning pattern images inputted to the node, at least one point;
a determination unit configured to determine, for each of the plurality of learning pattern images inputted to the node, whether the selected point belongs to a region of the target object in the learning pattern image;
a distribution unit configured to distribute and input, to one of lower nodes of each node, a learning pattern image for which said determination unit has determined that the selected point belongs to the region, and to distribute and input, to all of the lower nodes of each node, a learning pattern image for which said determination unit has determined that the selected point does not belong to the region; and
a storage unit configured to store an attribute of the learning pattern image input to a terminal node of the plurality of nodes in association with the node,
wherein said selection unit selects, from each of the plurality of learning pattern images inputted to the node, a plurality of points,
said determination unit determines, for each of the plurality of learning pattern images inputted to the node, whether a ratio of the selected plurality of points belonging to the region of the target object in the learning pattern image is larger than a threshold, and
said distribution unit distributes and inputs, to a lower node of each node, a learning pattern image for which said determination unit has determined that the ratio of the selected plurality of points belonging to the region of the target object in the learning pattern image is larger than the threshold, and distributes and inputs, to all of the lower nodes of each node, a learning pattern image for which said determination unit has determined that the ratio of the selected plurality of points belonging to the region of the target object in the learning pattern image is not larger than the threshold.

4. The apparatus according to claim 3, further comprising:
a recognition unit configured to input, to a root node, a set of patterns to undergo pattern recognition, and to recognize a pattern by executing a query created for each node while tracing the plurality of nodes.

5. A method of creating a classifier for classifying an attribute of a pattern image using a plurality of nodes consisting of a tree structure, comprising:
inputting a plurality of learning pattern images to each of the plurality of nodes, each of the plurality of learning pattern images including a target object;
selecting, from each of the plurality of learning pattern images inputted to the node, at least one point;
determining, for each of the plurality of learning pattern images inputted to the node, whether the selected point belongs to a region of the target object in the learning pattern image;
distributing and inputting, to a lower node of each node, a learning pattern image for which it has been determined that the selected point belongs to the region;
deleting a learning pattern image for which it has been determined in the determining that the selected point does not belong to the region; and
storing an attribute of the learning pattern image input to a terminal node of the plurality of nodes in association with the node,
wherein said selection step selects, from each of the plurality of learning pattern images inputted to the node, a plurality of points,
said determination step determines, for each of the plurality of learning pattern images inputted to the node, whether a ratio of the selected plurality of points belonging to the region of the target object in the learning pattern image is larger than a threshold,
said distribution step distributes and inputs, to a lower node of each node, a learning pattern image for which said determination step has determined that the ratio of the selected plurality of points belonging to the region of the target object in the learning pattern image is larger than the threshold, and
said deletion step deletes a learning pattern image for which said determination step has determined that the ratio of the selected plurality of points belonging to the region of the target object in the learning pattern image is not larger than the threshold.

6. A method of creating a classifier for classifying an attribute of a pattern image using a plurality of nodes consisting of a tree structure, comprising:
inputting a plurality of learning pattern images to each of the plurality of nodes, each of the plurality of learning pattern images including a target object;
selecting, from each of the plurality of learning pattern images inputted to the node, at least one point;
determining, for each of the plurality of learning pattern images inputted to the node, whether the selected point belongs to a region of the target object in the learning pattern image;
distributing and inputting, to one of lower nodes of each node, a learning pattern image for which it has been determined in the determining that the selected point belongs to the region, and distributing and inputting, to all of the lower nodes of each node, a learning pattern image for which it has been determined in the determining that the selected point does not belong to the region; and storing an attribute of the learning pattern image input to a terminal node of the plurality of nodes in association with the node, wherein said selecting step selects, from each of the plurality of learning pattern images inputted to the node, a plurality of points, said determining step determines, for each of the plurality of learning pattern images inputted to the node, whether a ratio of the selected plurality of points belonging to the region of the target object in the learning pattern image is larger than a threshold, and said distributing and inputting step distributes and inputs, to a lower node of each node, a learning pattern image for which said determining step has determined that the ratio of the selected plurality of points belonging to the region of the target object in the learning pattern image is larger than the threshold, and distributes and inputs, to all of the lower nodes of each node, a learning pattern image for which said determining step has determined that the ratio of the selected plurality of points belonging to the region of the target object in the learning pattern image is not larger than the threshold.

7. A non-transitory computer-readable storage medium storing a computer program for causing a computer, which creates a classifier for classifying an attribute of a pattern image using a plurality of nodes consisting of a tree structure, to function as an input unit configured to input a plurality of learning pattern images to each of the plurality of nodes, each of the plurality of learning pattern images including a target object, a selection unit configured to select, from each of the plurality of learning pattern images inputted to the node, at least one point;

a determination unit configured to determine, for each of the plurality of learning pattern images inputted to the node, whether the selected point belongs to a region of the target object in the learning pattern image, a distribution unit configured to distribute and input, to a lower node of each node, a learning pattern image for which the determination unit has determined that the selected point belongs to the region, a deletion unit configured to delete a learning pattern image for which the determination unit has determined that the selected point does not belong to the region, and a storage unit configured to store an attribute of the learning pattern image input to a terminal node of the plurality of nodes in association with the node, wherein said selection unit selects, from each of the plurality of learning pattern images inputted to the node, a plurality of points, said determination unit determines, for each of the plurality of learning pattern images inputted to the node, whether a ratio of the selected plurality of points belonging to the region of the target object in the learning pattern image is larger than a threshold, said distribution unit distributes and inputs, to a lower node of each node, a learning pattern image for which said determination unit has determined that the ratio of the selected plurality of points belonging to the region of the target object in the learning pattern image is larger than the threshold, and said deletion unit deletes a learning pattern image for which said determination unit has determined that the ratio of the selected plurality of points belonging to the region of the target object in the learning pattern image is not larger than the threshold.

8. A non-transitory computer-readable storage medium storing a computer program for causing a computer, which creates a classifier for classifying an attribute of a pattern image using a plurality of nodes consisting of a tree structure, to function as an input unit configured to input a plurality of learning pattern images to each of the plurality of nodes, each of the plurality of learning pattern images including a target object;

a selection unit configured to select, from each of the plurality of learning pattern images inputted to the node, at least one point, a determination unit configured to determine, for each of the plurality of learning pattern images inputted to the node, whether the selected point belongs to a region of the target object in the learning pattern image, a distribution unit configured to distribute and input, to one of lower nodes of each node, a learning pattern image for which the determination unit has determined that the selected point belongs to the region, and to distribute and input, to all of the lower nodes of each node, a learning pattern image for which the determination unit has determined that the selected point does not belong to the region, and a storage unit configured to store an attribute of the learning pattern image input to a terminal node of the plurality of nodes in association with the node, wherein said selection unit selects, from each of the plurality of learning pattern images inputted to the node, a plurality of points, said determination unit determines, for each of the plurality of learning pattern images inputted to the node, whether a ratio of the selected plurality of points belonging to the region of the target object in the learning pattern image is larger than a threshold, said distribution unit distributes and inputs, to a lower node of each node, a learning pattern image for which said determination unit has determined that the ratio of the selected plurality of points belonging to the region of the target object in the learning pattern image is larger than the threshold, and distributes and inputs, to all of the lower nodes of each node, a learning pattern image for which said determination unit has determined that the ratio of the selected plurality of points belonging to the region of the target object in the learning pattern image is not larger than the threshold.

* * * * *